US010277934B2

(12) United States Patent
Mandyam

(10) Patent No.: US 10,277,934 B2
(45) Date of Patent: Apr. 30, 2019

(54) PERMISSIONS MANAGEMENT FOR WATERMARKED DATA IN A BROADCAST ENVIRONMENT

(71) Applicant: QUALCOMM Incorporated, San Diego, CA (US)

(72) Inventor: Giridhar Dhati Mandyam, San Diego, CA (US)

(73) Assignee: QUALCOMM Incorporated, San Deigo, CA (US)

( * ) Notice: Subject to any disclaimer, the term of this patent is extended or adjusted under 35 U.S.C. 154(b) by 37 days.

(21) Appl. No.: 15/066,294

(22) Filed: Mar. 10, 2016

(65) Prior Publication Data

US 2016/0269765 A1 Sep. 15, 2016

Related U.S. Application Data

(60) Provisional application No. 62/132,766, filed on Mar. 13, 2015.

(51) Int. Cl.
H04N 21/254 (2011.01)
H04N 21/4627 (2011.01)
(Continued)

(52) U.S. Cl.
CPC ....... *H04N 21/2541* (2013.01); *G06T 1/0021* (2013.01); *H04N 21/4627* (2013.01); *H04N 21/4882* (2013.01); *H04N 21/6543* (2013.01); *H04N 21/8173* (2013.01); *H04N 21/8358* (2013.01); *H04N 21/8586* (2013.01); *G06T 2201/0064* (2013.01)

(58) Field of Classification Search
CPC .......... H04N 21/2541; H04N 21/4627; H04N 21/4882; H04N 21/6543; H04N 21/8173; H04N 21/8358; H04N 21/8586; H06T 1/0021; H06T 2201/0064
See application file for complete search history.

(56) References Cited

U.S. PATENT DOCUMENTS 5,796,829 A * 8/1998 Newby .................. H04N 7/163
348/E5.004
7,003,731 B1 2/2006 Rhoads et al.
(Continued)

OTHER PUBLICATIONS

International Search Report and Written Opinion—PCT/US2016/021979—ISA/EPO—dated May 23, 2016.

*Primary Examiner* — Robert J Hance
*Assistant Examiner* — Susan X Li
(74) *Attorney, Agent, or Firm* — The Marbury Law Group, PLLC

(57) ABSTRACT

Methods, devices, systems, and non-transitory process-readable storage media for a watermark client executing on a media receiver device to manage access to data related to watermark data from broadcast streams. An embodiment method performed by a processor of the media receiver device may include operations for receiving a broadcast stream from a broadcast channel, identifying watermark data within the received broadcast stream, obtaining data via a wide area network based on the identified watermark data, receiving a request for the obtained data from a resident application executing on the media receiver device, and determining whether the resident application is eligible to access the obtained data.

30 Claims, 7 Drawing Sheets

(51) Int. Cl.
    *H04N 21/8358*    (2011.01)
    *G06T 1/00*         (2006.01)
    *H04N 21/858*     (2011.01)
    *H04N 21/488*     (2011.01)
    *H04N 21/6543*    (2011.01)
    *H04N 21/81*      (2011.01)

(56) References Cited

U.S. PATENT DOCUMENTS

| | | |
|---|---|---|
| 2005/0021967 A1 | 1/2005 | Bruekers et al. |
| 2011/0055278 A1* | 3/2011 | Itoh .................. G06F 17/30289 707/785 |
| 2012/0054235 A1 | 3/2012 | Kitazato et al. |
| 2012/0054784 A1* | 3/2012 | Kitazato ............ H04N 21/2393 725/14 |
| 2013/0204415 A1 | 8/2013 | Fregley et al. |
| 2014/0283109 A1* | 9/2014 | Quong .................... G06F 21/10 726/27 |
| 2015/0089673 A1* | 3/2015 | Beckman ............... H04L 63/105 726/29 |
| 2015/0120879 A1* | 4/2015 | Yoakum ............ G06F 17/30861 709/219 |
| 2015/0264429 A1* | 9/2015 | Winograd ........ H04N 21/44204 725/19 |
| 2016/0080833 A1* | 3/2016 | Denoual ........ H04N 21/234327 725/116 |

* cited by examiner

PERMISSIONS MANAGEMENT FOR WATERMARKED DATA IN A BROADCAST ENVIRONMENT

RELATED APPLICATIONS

This application claims the benefit of priority to U.S. Provisional Application No. 62/132,766 entitled "Permissions Management for Watermarked Data in a Broadcast Environment" filed Mar. 13, 2015, the entire contents of both of which are hereby incorporated by reference.

BACKGROUND

In broadcast communication systems such as DVB-T, ATSC, eMBMS, watermark data is often used to enable content providers to deliver information directly to end users without the interference of broadcasters of the content, such as channel operators, cable/satellite companies, etc. Content watermarking involves embedding information into transmitted media (audio or video). For example, content providers, such as Disney or ABC, may include small amounts of useful data within program data to be broadcast over the air or via other broadcast platform (e.g., a cable or satellite).

SUMMARY

Various embodiments include methods and media receiver devices implementing the methods enabling a watermark client executing on the media receiver device to manage access to data related to watermark data from broadcast streams. Various embodiments may include receiving a broadcast stream from a broadcast channel, identifying watermark data within the received broadcast stream, obtaining data based on the identified watermark data, receiving a request for the obtained data from a resident application executing on the media receiver device, and determining whether the resident application is eligible to access the obtained data. In some embodiments, receiving a request for the obtained data from a resident application executing on the media receiver device may include receiving a request from the resident application to set up a connection to the broadcast stream, and establishing a connection to the broadcast stream in response to the received request, wherein the broadcast stream from a broadcast channel is received via the established connection. Some embodiments may further include propagating an event to the resident application in response to identifying the watermark data within the received broadcast stream.

In some embodiments, determining whether the resident application is eligible to access the obtained data comprises one or more of determining whether the resident application is eligible to access the obtained data based on a stored white list, determining whether an origin of the resident application is the same as a URL indicated in the watermark data of the broadcast stream, determining whether the resident application triggered a transmission of the broadcast stream, or determining whether a stored application manifest associated with the resident application indicates any relation to the broadcast stream. Some embodiments may further include updating a white list to indicate that the resident application eligible to receive data related to broadcast stream in response to determining that the resident application is eligible to access the obtained data. Some embodiments may further include performing a clean-up on the white list.

In some embodiments, the broadcast stream may be received in the media receiver device from a multichannel video program distributor. In some embodiments, the obtained data may be obtained by a wide area network or broadband connection.

Some embodiments may further include providing a denial message to the resident application in response to determining that the resident application is not eligible to access the obtained data, and providing the obtained data to the resident application in response to determining that the resident application is eligible to access the obtained data.

Some embodiments may include receiving a request from the resident application to set up a connection to a broadcast stream, establishing a connection to the broadcast stream in response to the received request, receiving a broadcast stream from a broadcast channel, identifying watermark data within the received broadcast stream, propagating an event to the resident application in response to identifying the watermark data within the received broadcast stream, obtaining data based on the identified watermark data, and determining whether the resident application is eligible to access the obtained data. In some embodiments determining whether the resident application is eligible to access the obtained data may include one or more of determining whether the resident application is eligible to access the obtained data based on a stored white list, determining whether an origin of the resident application is the same as a URL indicated in the watermark data of the broadcast stream, determining whether the resident application triggered a transmission of the broadcast stream, or determining whether a stored application manifest associated with the resident application indicates any relation to the broadcast stream. Some embodiments may further include updating a white list to indicate that the resident application eligible to receive data related to broadcast stream in response to determining that the resident application is eligible to access the obtained data. Some embodiments may further include performing a clean-up on the white list. In some embodiments, the broadcast stream may be received in the media receiver device by a multichannel video program distributor. Some embodiments may further include providing a denial message to the resident application in response to determining that the resident application is not eligible to access the obtained data, and providing the obtained data to the resident application in response to determining that the resident application is eligible to access the obtained data.

Further embodiments may include media receiver devices having a network interface configured to receive broadcast streams and a processor configured with processor-executable instruction to perform operations of the methods summarized above.

BRIEF DESCRIPTION OF THE DRAWINGS

The accompanying drawings, which are incorporated herein and constitute part of this specification, illustrate various embodiments, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments leverage watermark data from broadcast streams to form permissions policies for managing resident applications' access to data in a media receiver device. In various embodiments, a watermark client executing on the media receiver device may determine the resident applications also executing on the media receiver device that may access data related to the watermark data. For example, using a URL from watermark data, the watermark client may determine the resident applications that may have access to the watermark data and/or data obtained from remote sources using or based on the URL form the watermark data.

The word "embodiment" is used herein to mean "serving as an example, instance, or illustration." Any implementation described herein as "embodiment" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, set top boxes, and server computing devices. In various embodiments, computing devices may be configured with memory or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.). In general, the term "server" is used to refer to any computing device capable of functioning as a server, such as a master exchange server, web server, mail server, document server, and a personal or mobile computing device configured with software to execute server functions (e.g., a "light server"). A server may be a dedicated computing device or a computing device including a server module (e.g., running an application that may cause the computing device to operate as a server). A server module (or server application) may be a full function server module, or a light or secondary server module (e.g., light or secondary server application).

Figure 5:
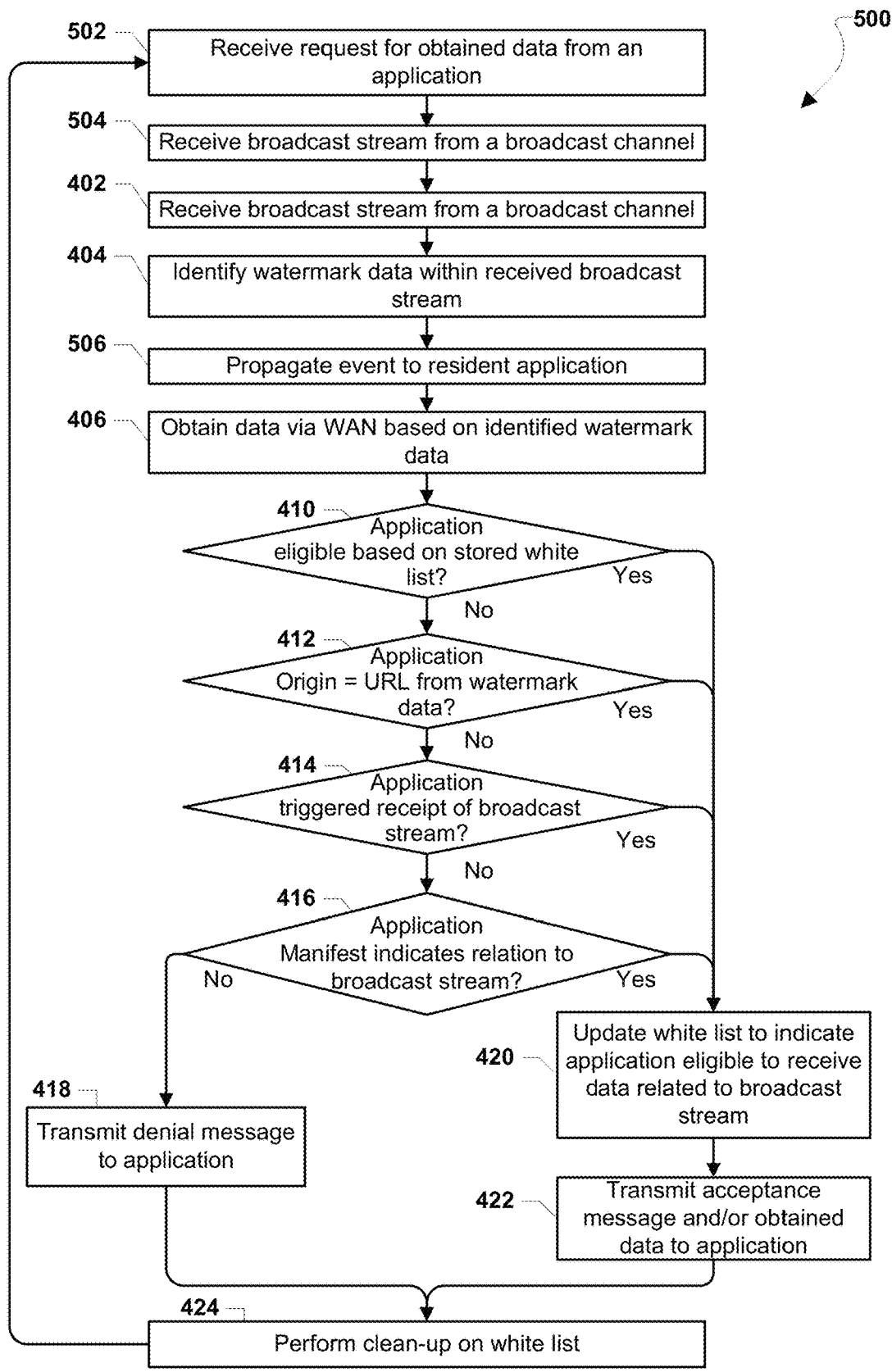
FIG. 5 is a process flow diagram illustrating an embodiment method for a watermark client executing on a processor of a media receiver device to provide obtained data related to a watermark of a broadcast stream to a local application.

The term "media receiver device" as used herein to refer to a computing device configured to receive broadcast program streams, such as from multichannel video program distributors (e.g., cable, satellite providers, etc.). Media receiver devices may be configured to at least execute various resident applications and a watermark client configured to process incoming broadcast streams and watermark data within the broadcast streams. Such a watermark client executing on an end user's media receiver device may extract watermark data from broadcast streams and use that watermark data to enable end user interactivity with the media. For example, a set top box receiver device or smart TV receiver device may use a watermark client to identify a URL related to a television show in order to retrieve data from a corresponding website to be rendered in combination with the show, thereby expanding the viewer's experience. An embodiment media receiver device is illustrated in FIG. 5.

Digital watermarking is a mature method of embedding information into media such as video or audio without significantly affecting the end user experience (e.g. due to distortion of the source media). Watermarking is of particular interest in the area of broadcast content, due to desire among content providers (e.g., Disney, ABC, CBS, etc.) to be able to provide information directly to end users (e.g., television viewers) that would enable interactivity without intermediation by broadcasters (e.g., cable providers, satellite providers, etc.). Watermark data may effectively be used as triggers to cause actions in media receiver devices, such as start downloading related/supplemental content from a remote server. For example, when watermark data within a broadcast football game may include a URL that may be used to fetch a statistics feed for fantasy football that otherwise could not be transmitted via the broadcast signal due to size. Broadcasters may include digitally-embedded watermarks within program data from content providers during standard broadcasting operations, such as transcoding. For example, an overhead channel with data may be adjusted or stripped out by broadcasters. Thus, watermark data that points devices to data sources other than broadcast streams via broadcasters are attractive to content providers.

Watermarking is generally considered a low-throughput mechanism for information transmission. This is due to the desire to minimize modification of the media. Information embedding via watermarking can occur through several different mechanisms, such as least-significant bit manipulation in images or phase encoding in audio. However, the net effect is that information throughput is typically limited to under 1 kbps. As a result, embedded watermarks in broadcast content are often hyperlinks through which a media receiver device can retrieve additional content via a broadband connection, such as by downloading data from a web server via a high-speed Internet connection.

Figure 1A:
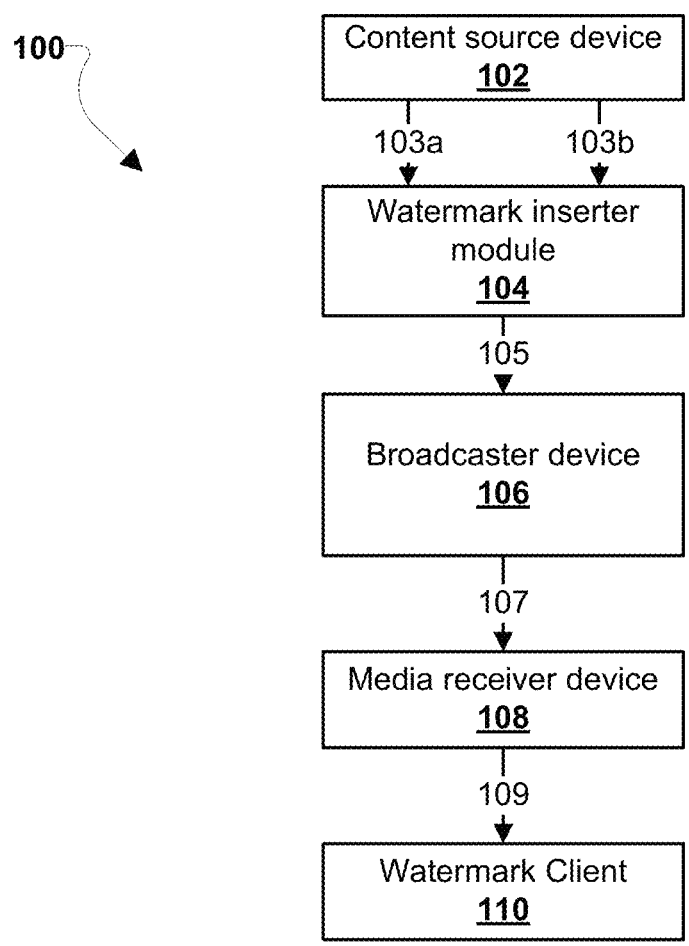
FIG. 1A is a diagram of a simplified embodiment communication of data in a broadcast system.

FIG. 1 illustrates an embodiment communication flow 100 of data including watermark data from components of a typical broadcast system. A content source device 102, such as a server associated with a content provider, may transmit audio/visual feeds and related information 103a and metadata 103b to a watermark inserter module 104. The watermark inserter module 104 may be a device, and/or circuitry, logic, software, etc. supported by or included within a device, such as within the content source device 102 and/or a broadcaster device 106 (e.g., broadcasting server, etc.).

The watermark inserter module 104 may insert watermark data within broadcast streams and provide these watermarked streams 105 to a broadcaster device 106 (i.e., multichannel video program distributor device (MVPD), system, network, or platform). The broadcaster device 106 may broadcast streams 107 with the watermarked content that are received by one or more media receiver devices 108. Broadcast streams 107 may contain the same content as the watermarked data streams 105 received by the broadcast server 106, but may be further formatted and/or time stamped for broadcasting. Such streams 107 may be compressed and/or otherwise processed for efficient and correct transmission via the various MVPD routes.

The media receiver device 108 may process the received broadcast streams, and may relay uncompressed audio and/or video feeds 109 that include watermark data to various components of the media receiver device 108. Typically, digital watermark data from the uncompressed audio/video information 109 may be interpreted by a watermark client 110 executing on the media receiver device 108 that has received the streams 107 of the content originated by the content provider of the content source device 102. The watermark client 110 may be configured to interpret the embedded watermark data and pass the media from broadcast streams 107 along to a receiver-based renderer and/or other components of the media receiver device 108.

Figure 1B:
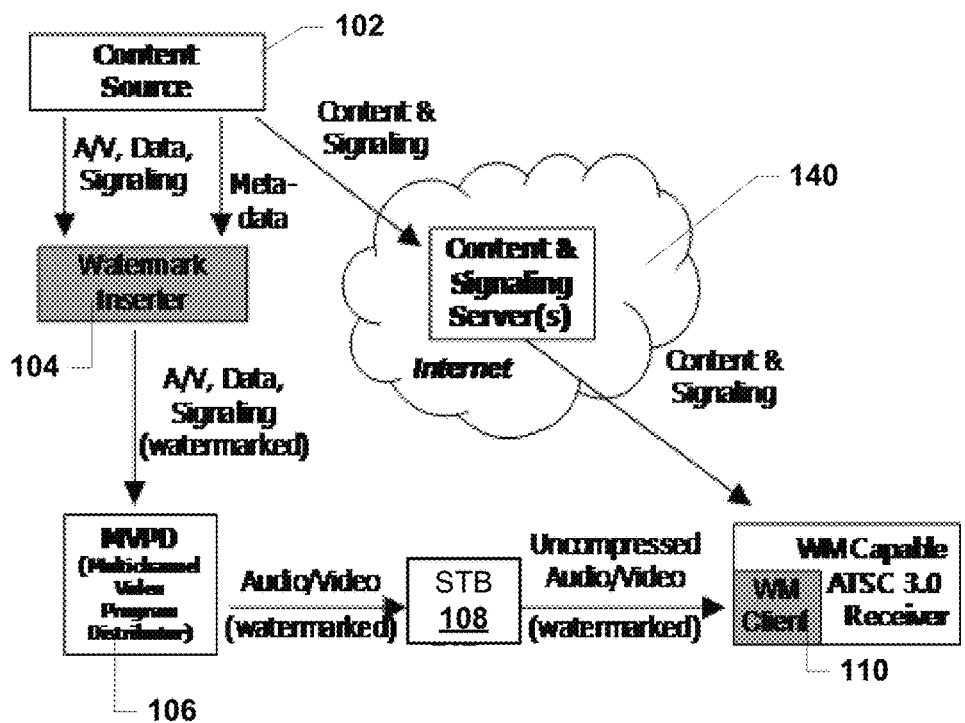
FIGS. 1B-C are diagrams of embodiment communications of data in broadcast systems.

In general, information within broadcast streams 107 (e.g., watermark data, etc.) may be handled in the media receiver device 108 in two ways: (1) being passed directly to an application resident on the media receiver device 108 that is configured to interpret the data (illustrated in FIG. 1B), or (2) being leveraged by the watermark client 110 to retrieve more information (i.e., metadata) related to the content from a server (illustrated in FIG. 1C). In particular, FIG. 1B illustrates embodiment communications of data in a broadcast system in which watermark data received in a media receiver device 108 includes data that may be used directly by resident applications.

Figure 1C:
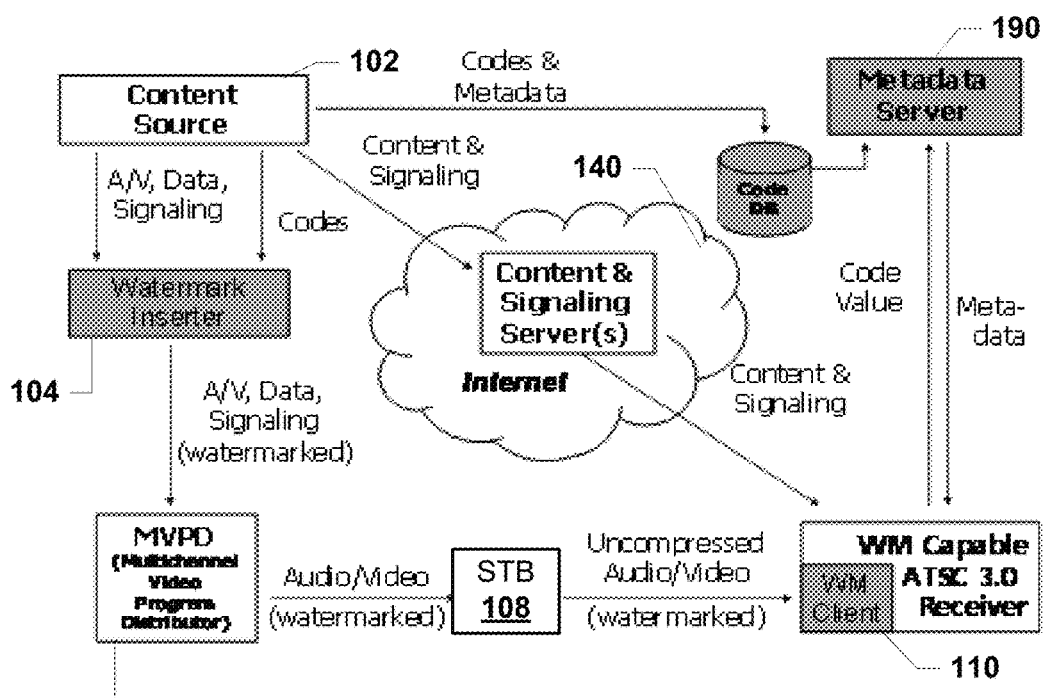

FIG. 1C illustrates embodiment communications of data in a broadcast system in which watermark data received in a media receiver device 108 includes codes that may be transmitted to a remote server 190 for obtaining data useable by resident applications, such as URLs or other data.

For broadcast-enabled receivers with broadband capabilities, such as smart TV's, broadband capability may not always be present due to factors such as intermittent connectivity or end users failing to properly configure the broadband connection. As a result, embedded data carried via watermarking (or watermark data within a broadcast stream) may be limited in the amount of information that can be retrieved by the broadcast connection. This includes any policies related to which applications resident in the media receiver device may access watermark-associated data retrieved by the watermark client.

Broadcast-capable media receiver devices, such as smart TV's, are starting to resemble many other computing devices that allow for the installation of third-party applications. In some cases, media receiver devices may be driven by web runtime engines (e.g., LGE's WebOS TV's, Comcast's RDK, and Samsung's Tizen OS). Therefore, it is possible to leverage web paradigms for data access based on application origin to also retrieve information from a watermark client.

However, it may not be clear how access to watermark data and/or data obtained via watermark data is managed with reference to resident application permissions and/or access. In other words, there may not be clear security models for determining the resident applications on the media receiver device that are eligible to receive data from the watermark client. For example, when a statistics ("stats") feed from a football website is obtained in response to identifying a URL within a football game broadcast stream, the watermark client may require some access control policies to identify whether a football application on the media receiver device should access that stats feed.

The various embodiments provide methods, devices, systems, and non-transitory process-readable storage media for leveraging watermark data from broadcast streams to form permissions policies for managing resident applications' access to data in a media receiver device. In particular, a watermark client executing on the media receiver device may be configured to determine the resident applications also executing on the media receiver device that can or are authorized to access data related to the watermark data. For example, using a URL from watermark data, the watermark client may determine the resident applications that may have access to the watermark data and/or data obtained from remote sources using or based on the URL form the watermark data. A primary advantage of the embodiment techniques over similar solutions (e.g. OMA DM) is that no explicit permissions policy needs to be sent or retrieved by the watermark client. For example, the watermark client may construct and maintain access policies for resident applications by leveraging watermark data via broadcast channels alone. This may be beneficial as sending application-specific policies over a broadcast channel may not be feasible given the limited throughput of broadcast interfaces and/or the lack of direct business relationship between content providers and broadcasters.

In various embodiments, the watermark client may utilize stored data associating the resident applications to watermark data, URLs, and/or other information that may indicate access permissions (i.e., "whitelist" data). For example, the whitelist may include a table listing various applications as corresponding to URLs that may be transmitted within watermark data from broadcast programs. "Whitelisting" may be performed by the watermark client on a rolling basis, such that as the watermark client identifies more and more data (e.g., URLs), the watermark client may add more permissions to the whitelist associated with resident applications eligible to access related data.

In some embodiments, if the watermark represents a URL then the origin can be matched to resident applications. This origin may be added to a white list of origins derived from previously-sent watermarks. In another embodiment, applications that initiate or trigger download actions to access the media stream can also have their origins added to the white list. In some embodiments, the watermark client may identify resident applications' eligibility to obtain data related to watermark data based on application manifests that may include data indicating connections to broadcast streams, content providers, etc. In some embodiments, the watermark client may infer connections between resident applications and watermark data and/or broadcast streams based on developer, content provider identity, and/or parent companies that are similar between the applications and the broadcast streams. For example, the white list may be inferred by the actual information of the watermark data, even if that information is intended to enhance end user interactivity with the media. In other words, context from the watermark data may be used to interpret permission policies and updates to the white list.

In some embodiments, the watermark client 110 may be configured to identify and notify all resident applications on the media receiver device that have access to newly received or incoming watermark data and/or related obtained data. In some embodiments, the watermark client 110 may utilize a subscription service that various resident applications may subscribe to in order to receive notifications indicating the receipt of related watermark data and/or obtained data.

In various embodiments, the watermark client may typically receive a bit stream of low throughput, on the order of 100 bits/second. Therefore, it may be unlikely, though not impossible, for the watermark data to contain an application permission policy similar to that which could be obtained through an OMA DM system.

Regarding hyperlink whitelisting, it may be likely that the embedded watermark data may contain a URL given the low throughput. In this case, such a URL's origin may be used to match against any receiver-based application origin to determine permissions for access. Regarding hyperlink reliability, given the low throughput associated with embedded watermark data, it may not be possible to add redundancy to watermarking payload data. Normally, the embedded watermark data may be associated with content interactivity, and in many cases a broadband connection (which may or may not be present) may be required to retrieve information related to this interactivity. As a result, the actual multimedia service may not be degraded from an end user perspective if the watermark client retrieves payload data with errors. However URL whitelisting may have security implications, and weak or non-existing error protection may not be sufficient.

In some embodiments, the media receiver device may perform an algorithm (e.g., a sequence of operations) for maintaining the white list based on incoming watermark data. If radio link quality measurements are available from a modem of the media receiver device, then this may be used as a metric to determine reliability in the absence of error protection. This may be similar to known concepts dating back to the early days of cellular communication. If such information is available it may be leveraged by the media receiver device. In some embodiments, the following algorithm/operations may be executed by the watermark client to verify redundancy over a pre-specified time duration of □and a redundancy lower bound (integer value) of L:

1) Start with empty URL whitelist array, denoted WL[ ]. Also maintain array of candidate origins WC_Cand[ ]. The size of WC_Cand[ ] may be dynamic, with the number of entries at any given instant in time represented by i(t).
2) Watermark client monitors incoming media for watermark payload data. If payload data includes a hyperlink, proceed to operation 3. Otherwise continue monitoring incoming media for watermark payload data in operation 2.
3) If an embedded hyperlink is successfully detected at time t—denoted as origin(t)):
   a) If the origin is not in the WC_Cand{ } array, add the origin to the WC_Cand{ } stack. WC_cand[i]={origin(t), t, 1}. i=i+1. Return to monitoring incoming media for watermark payload data in operation 2.
   b) If the origin is already in the WC_Cand[ ] array at index k and if $\Delta \le t-WC\_Cand[k,1]$ and WC_Cand[k,2]<L-1, then WC_Cand[k,2]=WC_Cand[k,2]+1. Return to monitoring incoming media for watermark payload data in operation 2.
   c) If the origin is already in the WC_Cand[ ] array at index k and if $\Delta \le t-WC\_Cand[k,1]$ and WC_Cand[k,2]=L-1, then add WC_Cand[k,0] to the origin whitelist. Remove WC_Cand[k] from the array and adjust the number of entries, i.e. i(t)=i(t)-1. Return to monitoring incoming media for watermark payload data in operation 2.
4) Remove any entry in WC_Cand[ ] array for which $\Delta \ge t-WC\_Cand[k,1]$, where k is the origin index.

In some embodiments, the media receiver device may execute a majority vote algorithm that includes receiving a URL via watermark data, assuming the URL is repeated, and averaging over several different copies at the reception.

In some embodiments, hyperlink reliability testing, such as with the above described algorithm, may utilize embedded URL watermark data in a least significant bit (LSB) in each pixel of still images. In such a case, the still images may each still look visible when rendered by the media receiver device even with the least significant bits taken out and/or including corrupted data. In some embodiments, devices may be configured to perform various simulations to confirm the operations and/or watermark data described above that correspond to the media receiver device. The following is an illustration of one such simulation. A DVB-T system may be simulated in which an 80×50 image may be sent with the least significant bit of each pixel modulated with a URL (e.g., "a.com"). The simulation may be at the bit-level using the outer and inner DVB-T codes (e.g., Reed-Solomon and convolutional, respectively), with random bit errors added to the output of the convolutional encoder. The decode error may be calculated, such as the decode error for the URL "a.com". When the channel bit error rate falls below 0.1 (10%), word detection probability may be assumed to be increased to the point where a repetition method may result in receiver detection.

Further embodiments include a computing device configured with processor-executable instructions for performing operations of the various methods described herein. Further embodiments include a non-transitory processor-readable medium on which is stored processor-executable instructions configured to cause a computing device (e.g., media receiver device) to perform operations of the methods described herein. Further embodiments include a communication system including a computing device configured with processor-executable instructions to perform operations of the methods described herein.

Figure 2:
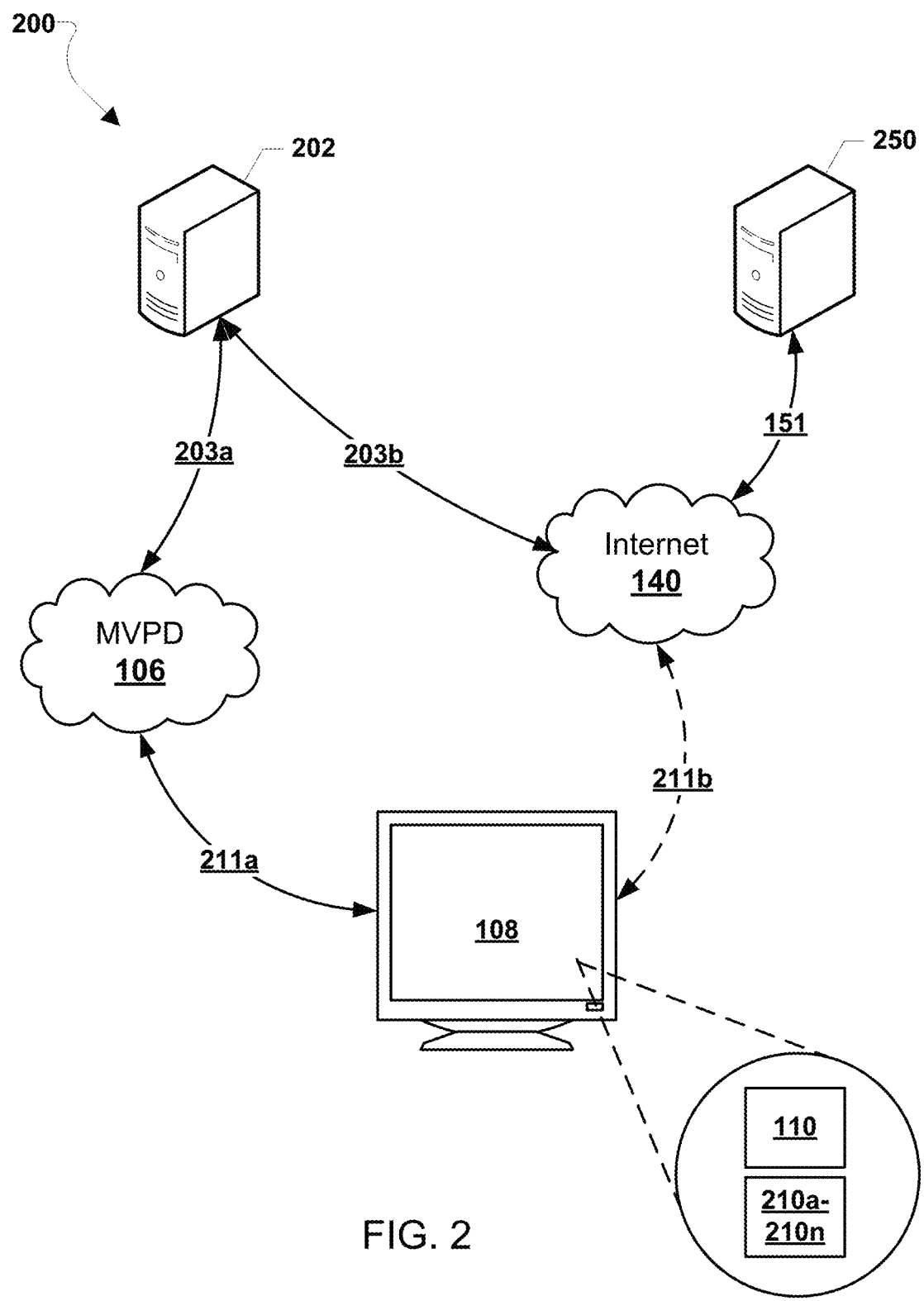
FIG. 2 is an embodiment broadcast communication system suitable for use in various embodiments.

FIG. 2 illustrates an embodiment broadcast communication system 200 suitable for use in various embodiments. The system 200 may include at least a content source server 202 configured to generate and/or deliver data streams of broadcast content (e.g., TV shows, sporting events, etc.), a multichannel video program distributor (MVPD) 106 (e.g., cable, satellite providers/broadcasters and associated servers and other equipment), and a media receiver device 108 configured to receive and render the data streams of broadcast content (e.g., a set top box, smart TV, etc.). The data streams may include audio/visual data as well as watermark data and may be delivered from the content source server 202 to the MVPD 106 via a connection 203a. The MVPD 106 may deliver the watermarked data streams of content to the media receiver device 108 via a connection 211a, such as various coaxial or fiber optic cables that connect with the media receiver device 108.

The media receiver device 108 may include various components, such as a processor and storage/memory, and further may be configured to execute various operations, routines, applications, and software instructions. In particular, the media receiver device 108 may be configured to execute at least a watermark client 110, such as an application, module, logic, and/or other functionality configured to identify, process, and utilize watermark data received in incoming data streams (e.g., program feeds originated by the content source server 202). In some conventional systems, applications (e.g., "host" applications) may act as intermediaries for other applications (e.g., "client" applications) that may leverage dynamically updateable policies to determine the applications that may access data or functionalities controlled by the host applications. For instance, the Open Mobile Alliance's Device Management specification (OMA DM) allows applications, such as a watermark client 110, to interact with management objects (MO's) that are provided by an OMA DM server. These MO's may contain access policies by which a watermark client 110 may manage data that it derives from embedded watermarks.

The media receiver device 108 may further execute other software or instruction sets, such as a plurality of resident applications 210a-210n associated with various third-parties. For example, the media receiver device 108 may be configured to install and execute applications (or "apps") associated with particular cable channels (e.g., ABC Family, ESPN, etc.). The resident applications 210a-210n may be pre-installed on the media receiver device 108 and/or downloaded from a remote source. In some embodiments, the media receiver device 108 may utilize various operating systems, thread-technologies, hypervisor/arbiter routines or processes, and/or other logic to control the communications and execution of the resident applications 210a-210n and the watermark client 110.

In some embodiments, the content source server 202 may also connect to a wide area network, such as the Internet 140, via a connection 203b. Likewise, various other servers 250 (e.g., web servers, data servers, etc.) may connect to the Internet 140 via a connection 151 in order to exchange data and signaling with various other devices, such as the content source server 202. In some embodiments, the media receiver device 108 may utilize a connection 211b to the Internet 140 (e.g., a broadband connection) in order to exchange messaging and data with remote sources, such as the other servers 250. For example, the media receiver device 108 may be configured to request particular data packets or feeds from the other servers 250 in response to obtaining watermark data within program data streams received via the MVPD 106. In general, the presence of broadband connections in media receiver devices 108 may not always be available.

In some embodiments, the connection 211b may be used as end users may choose not to configure broadband connectivity for the media receiver device 108, or the users may be in markets where broadband access to the home is intermittent or even non-existent. Therefore, various embodiments may provide a dynamic permission management model that may or may not leverage only the broadcast transmission stream via the connection 211a. In some embodiments, the connection 211b to the Internet 140 may be wired or wireless, such as an Ethernet or Wi-Fi® local area network connection.

Figure 3:
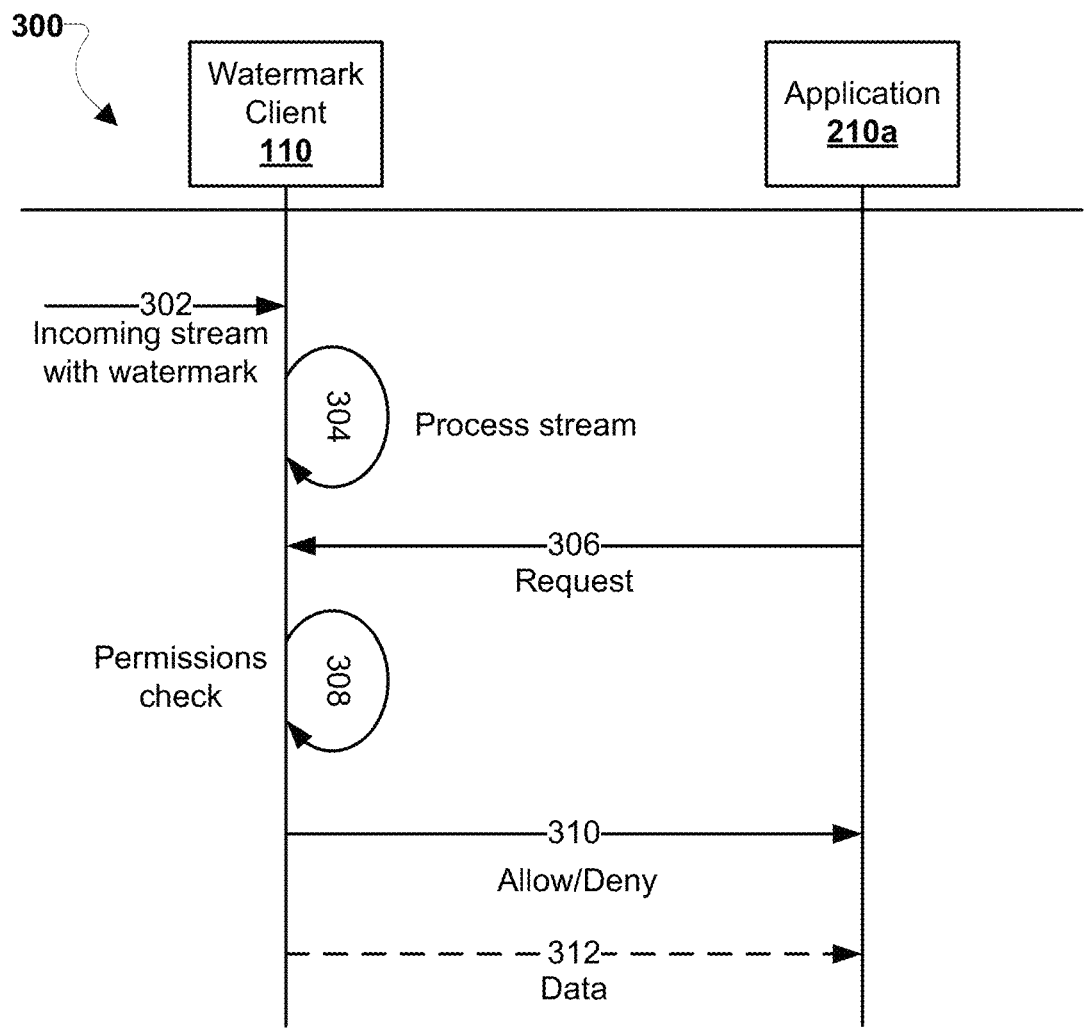
FIG. 3 is a call flow diagram illustrating communications between a watermark client and a resident application executing on a media reader device according to some embodiments.

FIG. 3 illustrates a diagram 300 of embodiment communications between a watermark client 110 and a resident application 210a executing on a media receiver device (e.g., a smart TV, etc.) according to some embodiments. The watermark client 110 may receive incoming streams 302 (i.e., broadcast streams/data streams) that include watermark data and perform operations 304 to process the incoming streams 302, such as identifying the watermark data individual from any audio/visual data included in the incoming streams 302. In some embodiments, the watermark data may be separately provided to the watermark client 110, and in other embodiments the incoming stream 302 may include uncompressed audio/video data. The operations 304 may also include utilizing the identified watermark data to download data from a remote data source, such as a web server or database associated with the incoming stream 302. For example, the watermark client 110 may transmit a request via the Internet to a web server associated with a fantasy football league in order to download a data feed of statistics relevant to a football game depicted in the incoming stream 302. In some embodiments, the watermark client 110 may be configured to perform data extraction from incoming streams 302, store information, and perform permissions arbitration for access to the stored data as described below.

Similar to a hypertext transfer protocol (HTTP) request, the resident application 210a may be configured to send a request message 306 to the watermark client 110 requesting data related to the incoming stream 302. In some embodiments, the request message 306 may correspond to the watermark data within the incoming stream 302 and/or any data obtained by the watermark client 110 in response to the execution of the operations 304 (e.g., downloaded data using a uniform resource locator (URL) from the watermark data).

In response to the request message 306, the watermark client 110 may perform various permissions checks 308 (or permission arbitration operations) to determine whether the resident application 210a has the appropriate authorizations or permissions to receive any data from the watermark client 110 regarding the incoming stream 302. For example, the watermark client 110 may compare the resident application 210a identifier to those within a stored "white list" of authorized applications for the incoming stream 302 and/or associated watermark data (e.g., URLs, etc.).

In response to the permissions checks 308, the watermark client 110 may transmit a response message 310 to the resident application 210a that either confirms that the resident application 210a is allowed or denied access to the data from the watermark client 110. If the resident application 210a has permission to retrieve the data, the watermark client 110 may also transmit data 312 to the resident application 210a, such as downloaded feed data from a remote source identified within the watermark data and associated with the incoming stream 302.

Figure 4:
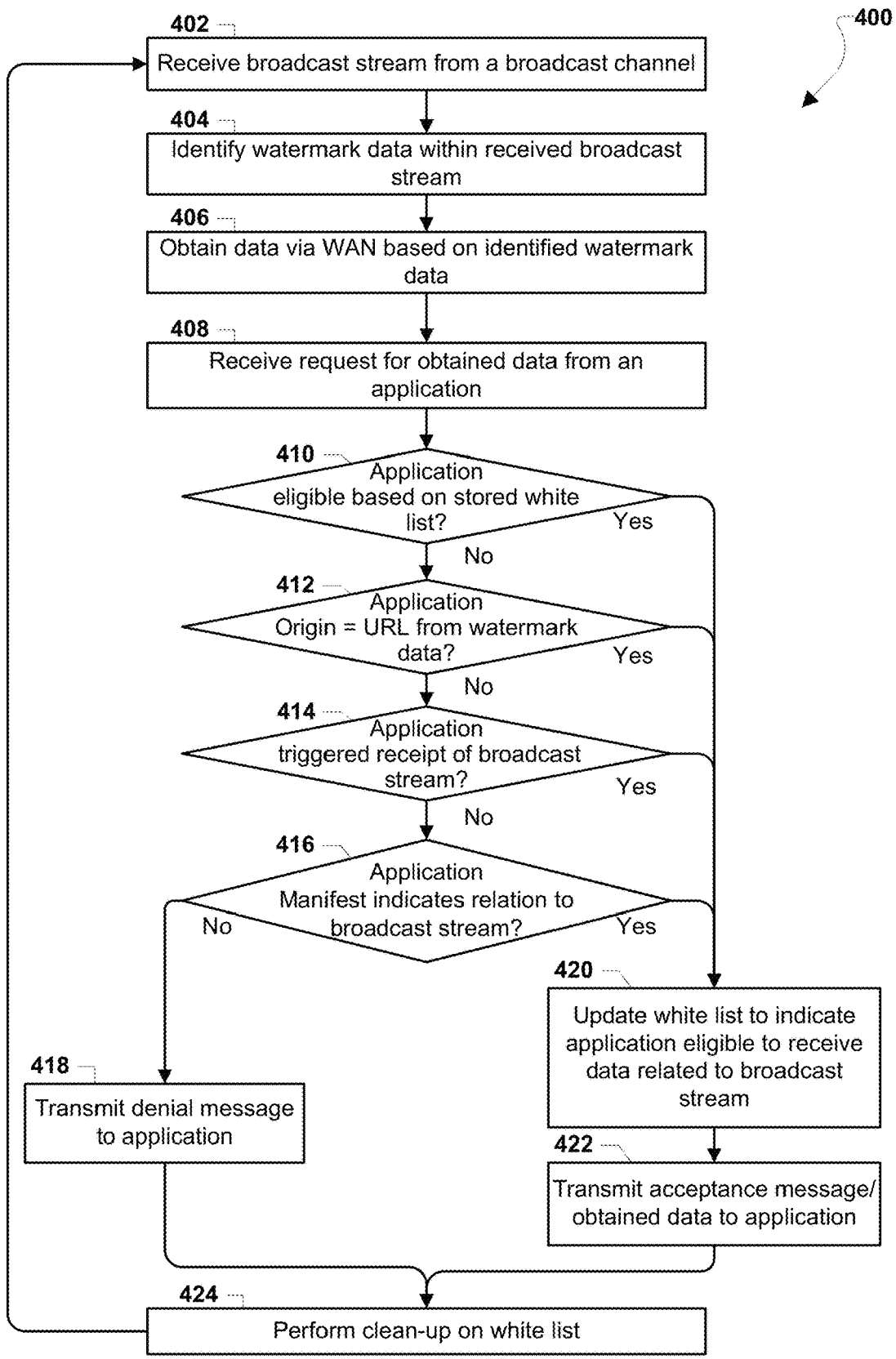
FIG. 4 is a process flow diagram illustrating an embodiment method for a watermark client executing on a processor of a media receiver device to provide obtained data related to a watermark of a broadcast stream to a local application.

FIG. 4 illustrates an embodiment method 400 for a processor of a media receiver device to manage access to data related to watermarking information of broadcast streams, and provide obtained data related to the watermarking to one or more of a plurality of resident applications executing on the media receiver device. In various embodiments, some or all of the operations of the method 400 may be performed via a watermark client executing on the processor of the media receiver device.

In block 402, the processor of the media receiver device may receive a broadcast stream from a broadcast channel. For example, via a MVPD (e.g., cable provider, satellite provider, etc.), the media receiver device may receive incoming program broadcast data/streams that depict sporting events, television shows, the news, etc. The broadcast stream may be received via a wired or wireless network interface, such as a network interface connected to a wide area or local area network, or wireless transceiver coupled to a wireless wide area network (e.g., a cellular data network) or a wireless local area network (e.g., a Wi-Fi access point).

In block 404, the processor of the media receiver device may identify watermark data within the received broadcast stream. For example, the media receiver device may uncompress the received broadcast stream data, if necessary, and analyze the data to separate watermark data from audio/visual data included in the stream. In various embodiments, the identified watermark data may include website addresses (e.g., URLs), codes, links, hints, messages, and/or other information that may be used by the watermark client on the media receiver device to obtain more data that may be used by various resident applications. For example, the watermark data may include a code that may be transmitted to a remote server via the Internet in order to receive a URL for downloading data packets related to the broadcast stream.

In block 406, the processor of the media receiver device may obtain data via a wide area network (i.e., Internet) based on the identified watermark data. For example, based on a URL within the watermark data of a football program, the media receiver device via its watermark client may transmit requests to a web server related to a football statistics service in order to receive statistics data feeds.

In block 408, the processor of the media receiver device may receive a request for the obtained data from a resident (or local) application executing on the media receiver device. For example, an internal signal, message, or other communication may be delivered to the watermark client from a resident application indicating that the obtained data can be used with the resident application. In response to receiving the request message, the media receiver device may determine whether the resident application is eligible to receive the obtained data using any combination of the following determinations in blocks 410-416.

Due to the low information throughput associated with content watermarking, it is expected that content providers may provide a URL by which the watermark client may retrieve information directly from a web server. Such URLs received over time via specific broadcast channels may be used to form a white list of allowed origins. Based on this white list, resident applications on the media receiver device may also access information available to the watermark client based on the application origin (e.g., derived from the application uniform resource identifier (URI)). Accordingly, in determination block 410, the processor of the media receiver device may determine whether the resident application is eligible to access the obtained data based on a stored white list. In particular, the watermark client may be configured to continually update entries within a database or other data structure that relate the identities of various resident applications to watermark data, program data streams, and/or other attributes associated with incoming data having watermarking information. For example, the watermark client may store a list of all the resident applications that are already known to be eligible, authorized, and/or permitted to receive watermark data and/or obtained data based on the watermark data due to a common-developer or content provider affiliation (e.g., application related to the television channel may have authorization to access downloaded data from the television channel's website, etc.).

In determination block 412, the processor of the media receiver device may determine whether the resident application's origin is the same as an origin indicated in the watermark data (e.g., same URLs). In other words, the media receiver device may determine whether the origin of the resident application is the same as a URL conveyed in the watermark data of the received broadcast stream. In general, a resident application that is used for rendering a particular broadcast stream may have its origin be part of the white list. For example, an installed (or resident) application on the media receiver device normally may have a URL associated with it based on a file system reference (e.g., fs://myapp.exe). Under general web paradigms, this kind of reference may be treated as a unique origin. The determination in block 412 may be performed in response to determining that the resident application is not eligible to receive the obtained data based on the stored white list (i.e., determination block 410="No").

In determination block 414, for example in response to determining that the application origin is not similar or equal to the URL in the watermark data of the broadcast stream (i.e., determination block 412="No"), the processor of the media receiver device may determine whether the application triggered the receipt (or the transmission to the media receiver device) of the broadcast stream. If an installed application triggers the download of the broadcast media stream with the associated embedded watermarking content (i.e., watermark data), the watermark client may identify that application as having permission to access any associated content related to that broadcast stream (i.e., use a permissions policy that the particular application has rights to direct access of the associated information). So, an application located at fs://path that triggers or invokes a stream (associated with a broadcast channel) with an embedded watermark data may always be assumed to have permission to access the embedded data. File URL's may be considered unique origins, so this permission would not extend to other applications. For example, when there is a resident application on the media receiver device that commanded the receiver device to start tuning to a NBC station (e.g., over the air via an affiliate, etc.), that application may then have access to any data retrieved due to NBC watermark data because the application triggered the tuning to receive the broadcast stream from NBC. As another example, in a simulcast situation where the broadcast stream is primarily delivered through a CBS affiliate, a CBS Sports application on the media receiver device may have rights to the watermark data for causing the tuning to the CBS affiliate. In other words, when a resident application tells the media receiver device to receive a broadcast stream, that application may have rights to any other data retrieved by the media receiver device due to watermark data from the broadcast stream.

In determination block 416, the processor of the media receiver device may, in response to determining that the application has not triggered the receipt of the broadcast stream (i.e., determination block 414="No"), determine whether a stored application manifest associated with the application indicates any relation to the broadcast stream (i.e., inferred origin and origin mapping). In some embodiments, the operating system of the media receiver device may or may not assign or recognize origins for installed resident applications (other than their location on the file system). In this case, origins may be inferred by querying the application manifest, if it is available. For instance, the W3C-defined manifest for web applications may include a "start_URL," which may ideally be the origin of the application. In addition, the operating system may assign an origin to the application that is not based on the file system and corresponds to a network location. In some embodiments, the application manifest may be an XML-based manifest that the watermark client may evaluate to see how an included URL attribute compares to watermark data of a broadcast stream. For example, the watermark client may evaluate a manifest and compare an included URI to a broadcast feed to see if there are similarities.

In some embodiments, inferences may be made based on external information obtained by the watermark client. For example, the watermark client may identify various identities (e.g., parent companies, domain names, etc.) associated with the broadcast stream for comparison to the identity of the resident application in order to determine whether there are any commonalities. For example, the watermark client may determine whether there is a match between the parent company of an ESPN application and a broadcast feed from ABC Family in order to determine whether the ESPN application has permission to access watermark data or downloaded data using the watermark data from the ABC Family. As another example, when watermark data indicates a URL (e.g., "YYY.com"), and a resident application is "YYY.com" trying to access the watermark data, then the watermark client may likely determine there is an inferred relation and thus permission. In some embodiments, when receiving content from one content source (e.g., ESPN) that includes watermark data indicating another source (e.g., watermark tells media receiver device to go to ABC.com), the watermark client may determine that there is still a relation and allow an ESPN application to access any related downloaded data from ABC.com.

In block 418, the processor of the media receiver device may, in response to determining that the stored application manifest associated with the application does not indicate a relation to the broadcast stream (i.e., determination block 416="No"), transmit a denial message to the application.

In block 420, the processor of the media receiver device may, response to determining that the application is eligible to receive the obtained data based on the stored white list (i.e., determination block 410="Yes"), or in response to determining that the application origin is similar or equal to the URL in the watermark data of the broadcast stream (i.e., determination block 412="Yes"), or in response to determining that the application triggered the receipt of the broadcast stream (i.e., determination block 414="Yes"), or in response to determining that the stored application manifest associated with the application indicates a relation to the broadcast stream (i.e., determination block 416="Yes"), update the white list to indicate that the application is eligible to receive data related to the broadcast stream.

In block 422, the processor of the media receiver device may transmit an acceptance message and/or the obtained data to the resident application that is eligible and authorized.

In response to performing either the operations of block 418 or 422, the processor of the media receiver device may perform a clean-up on the white list in block 424, such as removing unnecessary entries (e.g., out-dated, not accessed within a predetermined time frame, etc.). For example, the white list may be dynamic and maintained over time, with origin expiry based on business logic (e.g., if an embedded watermark has not reproduced a particular origin within X amount of time then the origin is deleted from the white list). The media receiver device may continue with the receiving operations in block 402.

FIG. 5 illustrates an embodiment method 500 for a processor of a media receiver device to manage access to data related to watermarking information of broadcast streams, and provide obtained data related to the watermarking to one or more of a plurality of resident applications executing on the media receiver device. In various embodiments, some or all of the operations of the method 500 may be performed via a watermark client executing on the processor of the media receiver device.

In block 502, the processor of the media receiver may receive a request from an application to establish a connection to a broadcast stream. The application may be a resident (or local) application executing on the media receiver device. For example, an internal signal, message, or other communication may be delivered to the watermark client from a resident application indicating that the resident application would like to obtain data from a broadcast stream.

In block 504, the processor of the media receiver device may establish a connection with the requested broadcast stream via a broadcast channel. For example, a transceiver (e.g., antenna(s)) of the media receiver device may establish a connection via a broadcast channel supported by a remote server (e.g., remote server 190 and/or content and signaling server located on a remote network).

In block 402, the processor of the media receiver device may, upon establishing a connection with the broadcast stream, receiver device may receive a broadcast stream from the established broadcast channel as described for the like numbered block in the method 400.

In block 404, the processor of the media receiver device may identify watermark data within the received broadcast stream as described for the like numbered block in the method 400.

In block 506, the processor of the media receiver device may propagate an event to the requesting resident application in response to identifying the watermark data within the received broadcast stream.

In block 406, the processor of the media receiver device may obtain data via a wide area network (i.e., Internet) based on the identified watermark data as described for the like numbered block in the method 400.

The processor of the media receiver device may then perform the operations of blocks 410 through 424 as described for the like numbered block in the method 400.

Figure 6:
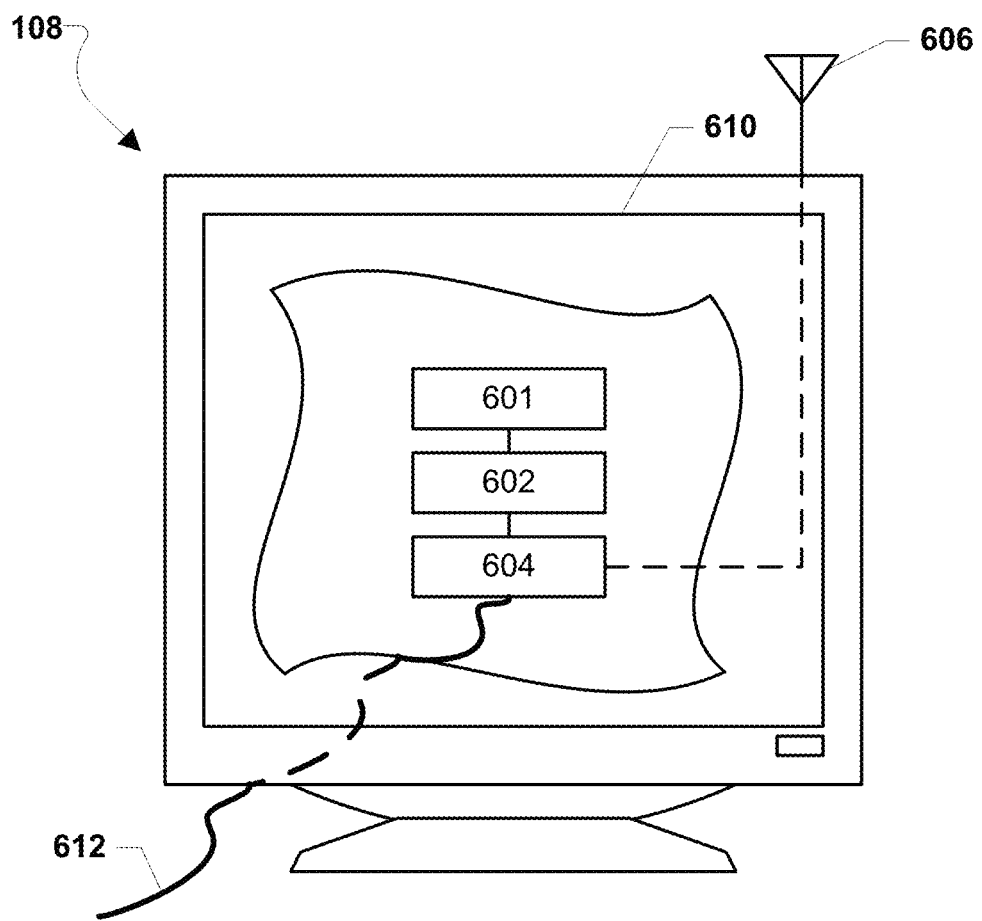
FIG. 6 is a component block diagram of a media receiver device suitable for use in an embodiment.

Various forms of computing devices, including personal computers, mobile computing devices (e.g., smartphones, etc.), servers, laptop computers, etc., may be used to implement the various embodiments. Such computing devices may typically include, at least, the components illustrated in FIG. 6, which illustrates an example television-type (e.g., smart TV) media receiver device 108. Such a media receiver device 108 may typically include a processor 601 capable of executing various software instructions, routines, logic, and/or operations (e.g., applications, operating system, etc.). The processor 601 may be coupled to volatile memory 602 and/or other storage or devices (e.g., a large capacity non-volatile memory, such as a disk drive, a floppy disc drive, compact disc (CD) or DVD disc drive coupled to the processor 601, etc.). The media receiver device 108 may also include various network interfaces 604 or access ports coupled to the processor 601 for establishing data connections with a network to receive broadcast streams, such as the Internet and/or a local area network coupled to other system computers and servers. The network interface 604 may be connected to a wide area or local area network via a cable 612 or other physical connection. Alternatively, the network interface 604 may be a wireless transceiver coupled to an antenna 606 and configured to establish a wireless communication link to a wireless wide area network (e.g., a cellular data network) or a wireless local area network (e.g., a Wi-Fi access point). The network interface 604 may or may not utilize or otherwise include a cord 612 or other physical connection. The media receiver device 108 may also include a display element 610 for rendering program data or other information. Components 601-602 of the media receiver device 108 may be interconnected via a bus or similar wired or wireless connectivity.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In various embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions that may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art. Thus, the present invention is not intended to be limited to the embodiments shown herein but is to be accorded the widest scope consistent with the following claims and the principles and novel features disclosed herein.

What is claimed is:

1. A method for a watermark client executing on a media receiver device to manage access to data related to watermark data from broadcast streams, comprising:
   receiving, in the media receiver device, a broadcast stream from a broadcast channel;
   identifying, by a processor of the media receiver device, watermark data within the received broadcast stream;
   obtaining, by the processor, data based on the identified watermark data;
   receiving, by the processor, a request for the obtained data from a resident application executing on the media receiver device; and
   determining, by the processor, whether the resident application is eligible to access the obtained data by
      determining, by the processor, whether the resident application triggered a reception of the broadcast stream.

2. The method of claim 1, wherein receiving a request for the obtained data from a resident application executing on the media receiver device comprises:
   receiving, by the processor, a request from the resident application to set up a connection to the broadcast stream; and
   establishing, by the processor, a connection to the broadcast stream in response to the received request, wherein the broadcast stream from a broadcast channel is received via the established connection.

3. The method of claim 2, further comprising:
propagating, by the processor, an event to the resident application in response to identifying the watermark data within the received broadcast stream.

4. The method of claim 1, wherein determining whether the resident application is eligible to access the obtained data further comprises one or more of:
determining, by the processor, whether an origin of the resident application corresponds to a URL indicated in the watermark data of the broadcast stream;
determining, by the processor, whether the resident application is eligible to access the obtained data based on a stored white list; or
determining, by the processor, whether a stored application manifest associated with the resident application indicates any relation to the broadcast stream.

5. The method of claim 4, further comprising updating, by the processor, a white list to indicate that the resident application is eligible to receive data related to broadcast stream in response to determining that the resident application is eligible to access the obtained data.

6. The method of claim 4, further comprising performing, by the processor, a clean-up on the white list.

7. The method of claim 1, wherein the broadcast stream is received in the media receiver device from a multichannel video program distributor.

8. The method of claim 1, wherein the obtained data is obtained by a wide area network or broadband connection.

9. The method of claim 1, further comprising:
providing, by the processor, a denial message to the resident application in response to determining that the resident application is not eligible to access the obtained data; and
providing, by the processor, the obtained data to the resident application in response to determining that the resident application is eligible to access the obtained data.

10. A method for a watermark client executing on a media receiver device to manage access to data related to watermark data from broadcast streams, comprising:
receiving, by a processor of the media receiver device, a request from a resident application to set up a connection to a broadcast stream;
establishing, by the processor, a connection to the broadcast stream in response to the received request;
receiving, in the media receiver device, a broadcast stream from a broadcast channel;
identifying, by the processor, watermark data within the received broadcast stream;
propagating, by the processor, an event to the resident application in response to identifying the watermark data within the received broadcast stream;
obtaining, by the processor, data based on the identified watermark data; and
determining, by the processor, whether the resident application is eligible to access the obtained data by
determining, by the processor, whether the resident application triggered a reception of the broadcast stream.

11. The method of claim 10, wherein determining whether the resident application is eligible to access the obtained data further comprises one or more of:
determining, by the processor, whether an origin of the resident application corresponds to a URL indicated in the watermark data of the broadcast stream;
determining, by the processor, whether the resident application is eligible to access the obtained data based on a stored white list; or
determining, by the processor, whether a stored application manifest associated with the resident application indicates any relation to the broadcast stream.

12. The method of claim 11, further comprising updating, by the processor, a white list to indicate that the resident application is eligible to receive data related to broadcast stream in response to determining that the resident application is eligible to access the obtained data.

13. The method of claim 11, further comprising performing, by the processor, a clean-up on the white list.

14. The method of claim 10, wherein the broadcast stream is received in the media receiver device by a multichannel video program distributor.

15. The method of claim 10, further comprising:
providing, by the processor, a denial message to the resident application in response to determining that the resident application is not eligible to access the obtained data; and
providing, by the processor, the obtained data to the resident application in response to determining that the resident application is eligible to access the obtained data.

16. A media receiver device, comprising:
a network interface configured to receive a broadcast stream; and
a processor coupled to the network interface and configured to:
receive a broadcast stream from a broadcast channel;
identify watermark data within the received broadcast stream;
obtain data based on the identified watermark data;
receive a request for the obtained data from a resident application executing on the media receiver device; and
determine whether the resident application is eligible to access the obtained data by
determining whether the resident application triggered a reception of the broadcast stream.

17. The media receiver device of claim 16, wherein the processor is configured with processor-executable instructions to receive a request for the obtained data from a resident application executing on the media receiver device by:
receiving a request from the resident application to set up a connection to the broadcast stream; and
establishing a connection to the broadcast stream in response to the received request, wherein the broadcast stream from a broadcast channel is received via the established connection.

18. The media receiver device of claim 17, wherein the processor is further configured to:
propagate an event to the resident application in response to identifying watermark data within the received broadcast stream.

19. The media receiver device of claim 16, wherein the processor is further configured with processor-executable instructions to determine whether the resident application is eligible to access the obtained data by one or more of:
determining whether an origin of the resident application corresponds to a URL indicated in the watermark data of the broadcast stream;
determining whether the resident application is eligible to access the obtained data based on a stored white list; or determining whether a stored application manifest associated with the resident application indicates any relation to the broadcast stream.

20. The media receiver device of claim 19, wherein the processor is further configured with processor-executable instructions to update a white list to indicate that the resident application is eligible to receive data related to broadcast stream in response to determining that the resident application is eligible to access the obtained data.

21. The media receiver device of claim 19, wherein the processor is further configured with processor-executable instructions to perform a clean-up on the white list.

22. The media receiver device of claim 16, wherein the network access is configured to receive the broadcast stream from a multichannel video program distributor.

23. The media receiver device of claim 16, wherein the processor is configured such that the obtained data is obtained by a wide area network or broadband connection.

24. The media receiver device of claim 16, wherein the processor is further configured to:
 transmit a denial message to the resident application in response to determining that the resident application is not eligible to access the obtained data; and
 provide the obtained data to the resident application in response to determining that the resident application is eligible to access the obtained data.

25. A media receiver device to manage access to data related to watermark data from broadcast streams, comprising:
 a network interface configured to receive a broadcast stream; and
 a processor coupled to the network interface and configured to:
  receive a request from a resident application to set up a connection to a broadcast stream;
  establish a connection to the broadcast stream in response to the received request;
  receive in the media receiver device, a broadcast stream from a broadcast channel;
  identify watermark data within the received broadcast stream;
  propagate an event to the resident application in response to identifying the watermark data within the received broadcast stream;
  obtain data based on the identified watermark data; and
  determine whether the resident application is eligible to access the obtained data by
   determining whether the resident application triggered a reception of the broadcast stream.

26. The media receiver device of claim 25, wherein the processor is further configured with processor-executable instructions to determine whether the resident application is eligible to access the obtained data by one or more of:
 determining whether an origin of the resident application corresponds to a URL indicated in the watermark data of the broadcast stream;
 determining whether the resident application is eligible to access the obtained data based on a stored white list; or
 determining whether a stored application manifest associated with the resident application indicates any relation to the broadcast stream.

27. The media receiver device of claim 26, wherein the processor is further configured with processor-executable instructions to update a white list to indicate that the resident application is eligible to receive data related to broadcast stream in response to determining that the resident application is eligible to access the obtained data.

28. The media receiver device of claim 26, wherein the processor is further configured with processor-executable instructions to perform a clean-up on the white list.

29. The media receiver device of claim 25, wherein the network access is configured to receive the broadcast stream from a multichannel video program distributor.

30. The media receiver device of claim 25, wherein the processor is further configured with processor-executable instructions to:
 provide a denial message to the resident application in response to determining that the resident application is not eligible to access the obtained data; and
 provide the obtained data to the resident application in response to determining that the resident application is eligible to access the obtained data.

* * * * *